United States Patent [19]

Musk

[11] Patent Number: 5,577,145
[45] Date of Patent: Nov. 19, 1996

[54] OPTICAL CONNECTOR INCLUDING SPLIT SLEEVE SECURED IN EXPANDED STATE

[75] Inventor: Robert W. Musk, Suffolk, United Kingdom

[73] Assignee: Hewlett-Packard Company, Palo Alto, Calif.

[21] Appl. No.: 428,230

[22] PCT Filed: Nov. 30, 1993

[86] PCT No.: PCT/GB93/02455

§ 371 Date: May 1, 1995

§ 102(e) Date: May 1, 1995

[87] PCT Pub. No.: WO94/12901

PCT Pub. Date: Jun. 9, 1994

[30] Foreign Application Priority Data

Nov. 30, 1992 [JP] Japan .................................. 4-320772

[51] Int. Cl.⁶ .................................................. G02B 6/36
[52] U.S. Cl. ............................ 385/88; 385/78; 385/81
[58] Field of Search .............................. 385/76–78, 81, 385/84, 88, 89, 90, 91, 92

[56] References Cited

U.S. PATENT DOCUMENTS

| | | | |
|---|---|---|---|
| 4,461,538 | 7/1984 | Breed, III et al. | 385/88 |
| 4,684,210 | 8/1987 | Matsunaga et al. | 385/88 |
| 4,707,068 | 11/1987 | Moulin | 385/73 X |
| 4,737,008 | 4/1988 | Ohyama et al. | 385/88 X |
| 4,892,379 | 1/1990 | Takeda et al. | 350/96.21 |
| 5,050,953 | 9/1991 | Anderson et al. | 385/93 X |
| 5,104,242 | 4/1992 | Ishikawa | 385/53 |
| 5,109,454 | 4/1992 | Okuno et al. | 385/92 |
| 5,151,961 | 9/1992 | Hvezda et al. | 385/60 |
| 5,179,608 | 1/1993 | Ziebol et al. | 385/81 |
| 5,239,603 | 8/1993 | Sonoda et al. | 385/70 |
| 5,243,681 | 9/1993 | Bowen et al. | 385/140 |
| 5,317,663 | 5/1994 | Beard et al. | 385/70 |
| 5,432,879 | 7/1995 | Lee | 385/60 |
| 5,434,941 | 7/1995 | Bechtel et al. | 385/94 |

FOREIGN PATENT DOCUMENTS

| | | |
|---|---|---|
| 014610A1 | 1/1980 | European Pat. Off. . |
| 59-157606 | 9/1984 | Japan . |
| WO86/00423 | 6/1985 | WIPO . |

*Primary Examiner*—Rodney B. Bovernick
*Assistant Examiner*—Hemang Sanghari
*Attorney, Agent, or Firm*—Nixon & Vanderhye

[57] ABSTRACT

An optical connector is provided which can achieve an accurate alignment between an optical ferrule and an optical device in spite of a variation in dimension of the optical ferrule. A split sleeve 13a has an elastic deformation characteristic and has its fixed end portion inserted into a cylindrical robe 14 on a receptacle 2 side and fixed there. The split sleeve 13a has an inner diameter made somewhat smaller than the outer diameter of the ferrule 18. During a time period in which the ferrule 18 is inserted in the split sleeve 13a, the ferrule 18 is aligned with an active device 5 with the ferrule 18 elastically gripped by the split sleeve 13a. With the fixed end portion of the split sleeve 13a fixed in the cylindrical tube 14 a force for returning the split sleeve 13a back to its original inner diameter acts upon the fixed end portion of the split sleeve 13a, thereby suppressing a loss in the elastic deformation characteristic of the split sleeve 13a resulting from a passage of time in use.

12 Claims, 10 Drawing Sheets

OPTICAL CONNECTOR INCLUDING SPLIT SLEEVE SECURED IN EXPANDED STATE

FIELD OF THE INVENTION

The present invention relates to an optical connector for optical connection between optical transmission lines or between an optical transmission line and a opto-electronic conversion element.

BACKGROUND OF THE INVENTION

In a known optical connector, a receptacle housing is used which, in order to achieve an accurate alignment between a fibre optic ferrule and a opto-electronic conversion element (light emitting element or light receiving element), contains a precision bore to maintain the ferrule accurately in position. In order to achieve the necessary strict tolerances of the fixed bore, it is necessary that the fixed bore of the housing be exactly machined by a precision machine tool. Even if the fixed bore is accurately formed, it does not allow for elastic deformation to accommodate variations in ferrule sizes and manufacturing tolerances associated with the manufacture of the ferrule. It is, therefore, difficult to obtain a standardised optical connector with high reliability of alignment between the ferrule and aforementioned element. Further, since the required accuracy and stability of alignment requires a relatively long connection between the ferrule and the opto-electronic element, and the fixed bore is formed as a cylindrical projection extending from the receptacle housing, relatively high manufacturing costs are associated with such an the optical connector.

In another known optical connector, a precision split sleeve or a hollow tube is employed to connect together two ferrules or to make a connection between one ferrule and an active device on which a dummy ferrule of the same structure as the ferrule is mounted. In order to achieve an accurate alignment, the split sleeve has an inner diameter made slightly smaller than the outer diameter of the ferrules. Since such a split sleeve is always used in a manner which causes the sleeve to expand when fitted onto the ferrules, the diameter of the split sleeve does not have a set, fixed diameter. Because of this, an accurate ferrule-to-ferrule alignment with an adequate pressure force is difficult to achieve.

When the ferrule is connected to the active device, the dummy ferrule is mounted on the forward end portion of the receptacle housing and then needs to be inserted into the split sleeve. Thus an even greater ferrule-to-device connection length is required than in the case of the first mentioned connector type, and the optical connector involves a relatively high manufacturing cost.

BRIEF DESCRIPTION OF THE INVENTION

The present invention aims to provide an improved optical connector which addresses problems inherent in existing optical connectors.

More specifically, the object of the present invention is to provide an optical connector which can accommodate some size variations and manufacturing tolerances, that can be provided as a standardised optical connector with highly reliable connection.

According to the present invention, an optical connector is provided for optically connecting together first and second optical media having corresponding optical input/output ends, comprising: plug means for supporting the first optical medium; receptacle means connectable to the plug means and supporting the second optical medium; and a split tube member having a free end via which the optical input/output end of the first optical medium can be inserted and an end fixed to the receptacle means and located at the optical input/output end of the second optical medium and a slit extending from its free end to its fixed end and gripping the first optical medium through an elastic deformation toward its substantial centre axis, wherein, when the plug mean is connected to the receptacle means, the optical input/output end of the first optical medium is optically aligned with that of .the second optical medium through the elastic deformation of the split tube member.

Preferably, the optical connector further comprises urging means for urging the gripping of the first optical medium through the elastic deformation of the split tube member.

The optical connector includes the urging means comprised of guide means for guiding the insertion of the first optical medium into the split tube member.

The first optical medium includes an optical transmission line and the second optical medium includes an optical transmission line or a opto-electronic conversion element.

It should be observed that in an optical connector according to the present invention the first optical medium is gripped through the elastic deformation of the split type tube member and the fixed end of the split tube member is fixed to the receptacle means, thus suppressing a loss in the elastic deformation characteristic of the split tube member with a passage of time in use.

DESCRIPTION OF THE DRAWINGS

The present invention will now be described further by way of example and with reference to the accompanying drawings, of which.

In the drawings, the parts are referred to by reference numerals as follows:

1 plug (plug means)
2 receptacle (receptacle means)
5 active device (second optical medium)
13a first sleeve (split tube member)
13b second sleeve (urging means, guide means)
17 leads for opto-electronic conversion element
18 ferrule (first optical medium, optical transmission line)
18a optical input/output end of ferrule

DESCRIPTION OF THE PREFERRED EMBODIMENTS

Figure 1:
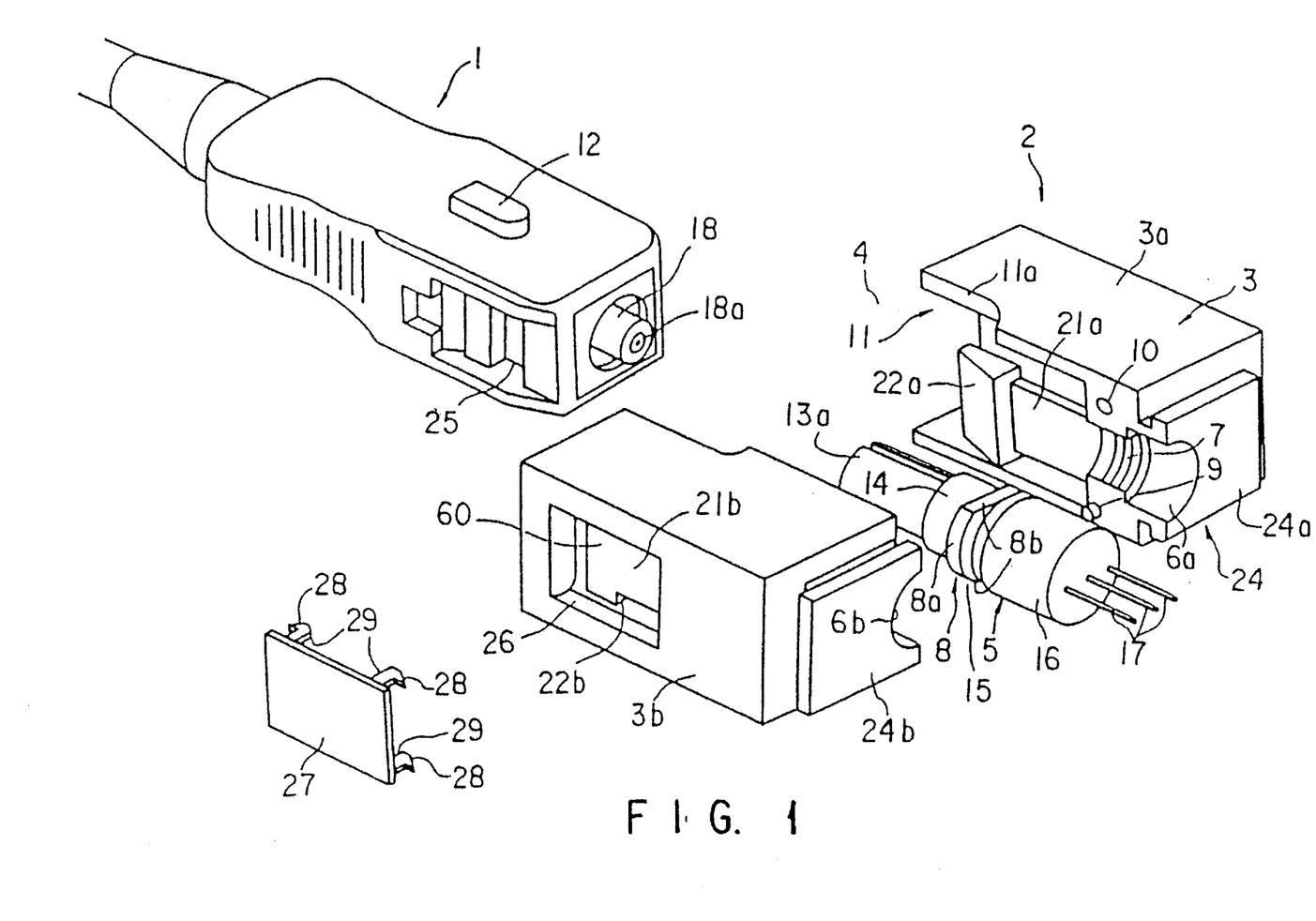
FIG. 1 is a perspective, exploded view showing an optical connector according to a fast embodiment of the present invention.

Referring first to FIG. 1, an optical connector includes a plug 1, a receptacle 2 associated with the plug 1, and a first sleeve 13a arranged between the plug 1 and the receptacle 2.

The receptacle 2 includes a rectangular housing 3 having a rectangular opening 4 at one end and an active device 5 enclosed in the housing 3.

Figure 2:
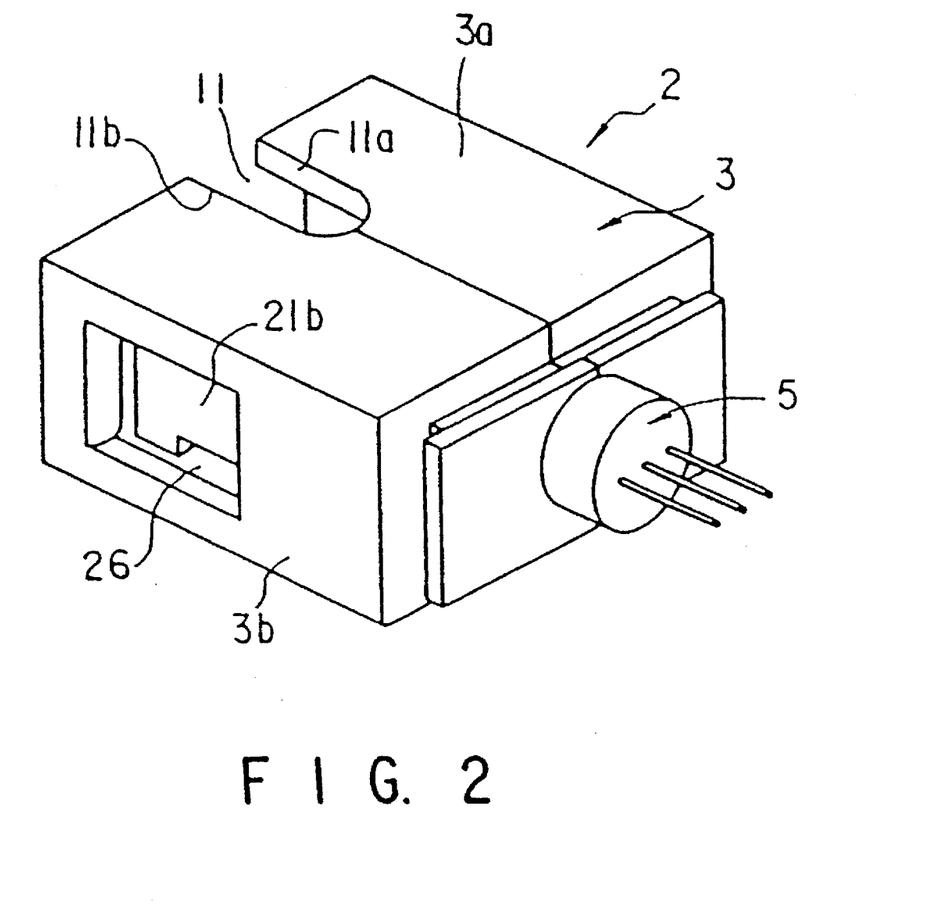
FIG. 2 is a perspective view showing a receptacle in an assembled optical connector in FIG. 1.

It is preferable that the rectangular housing 3 be of the so-called SC style shell construction as shown in FIG. 2. The rectangular housing 3 is comprised of a combination of two shells 3a, 3b of injection-molded synthetic resin.

Each of the shells 3a and 3b is of such a type as to hold the rear end portion of the active device 5 therebetween. More particularly, the shells 3a and 3b provide a pair of recesses 6a, 6b at those inner walls of their rear end portions which face each other when the shells 3a and 3b are assembled together. Grooves 7 are provided in the inner walls of the recesses 6a, 6b of the shells to allow a flange 8 which is provided on the outer periphery of the active device 5 to be fired in the grooves 7.

A projection 9 and hole 10 are formed at each of the mating end face portions of the rear end portions of the shells 3a and 3b. Upon assembly of the housing 3, the shells 3a and 3b are mated together with the projection 9 fitted into the corresponding hole 10, thereby fixedly positioning the shells 3a, 3b relative to each other.

Cutouts 11a and 11b are provided on the forward end side of the mating end faces of the shells 3a and 3b. The cutouts 11a and 11b provide a key-way 11 when these shells 3a and 3b are assembled together.

A key 12 is provided at the outer periphery of a housing of the plug 1 and adapted to be inserted into the key-way 11. By inserting the key 12 into the key-way 11 upon mounting the plug 1 into the receptacle 2, the plug 1 is oriented so that an optical fibre ferrule 18 can be inserted into the first sleeve 13a.

Figure 3A:
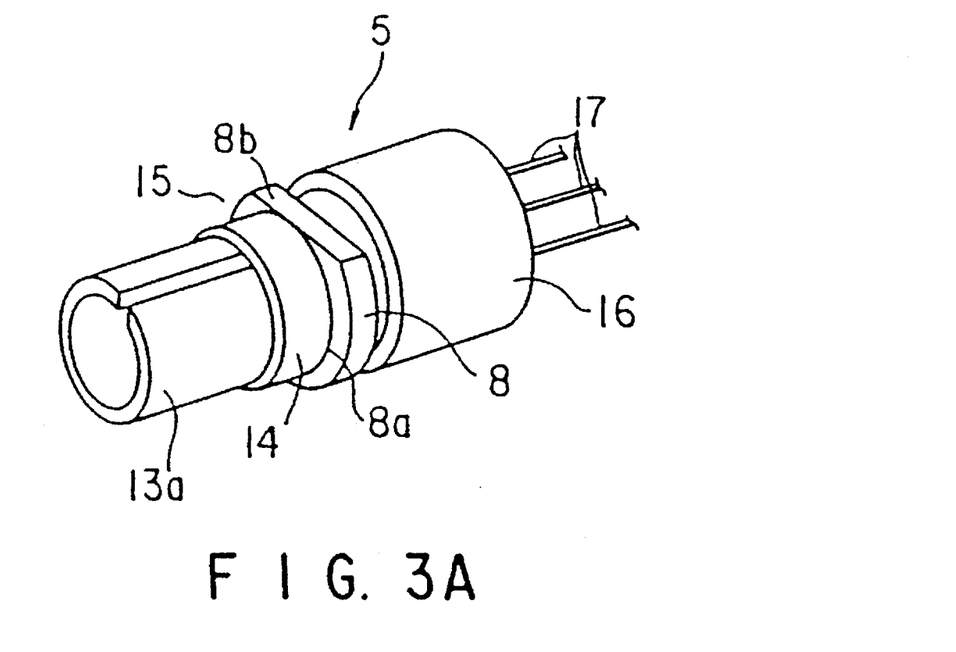
FIG. 3(A) is a perspective view showing an active device associated with the receptacle.

Referring to FIG. 3(A), the first sleeve 13a is mounted on the active device 5 so that it can be connected to the ferrule 18 of the plug 1 in an aligned relation. The active device 5 includes a front housing 15 having a flange 8 and cylindrical tube 14 extending, as an integral unit, in the axial direction of the first sleeve 13a and made of a metal, such as stainless steel, or plastics, and a rear housing 16 having, at the first sleeve 13a side, an optical input/output window, not shown, for a opto-electronic conversion element as will be set out below.

The known opto-electronic conversion element (light emitting element or light receiving element) is incorporated into the rear housing 16. The conversion element has leads 17 projecting from the rear wall of the rear housing 16, as shown in FIG. 3(A). The light emitting/receiving surface of the conversion element corresponds to the optical input/output end.

Figure 3B:
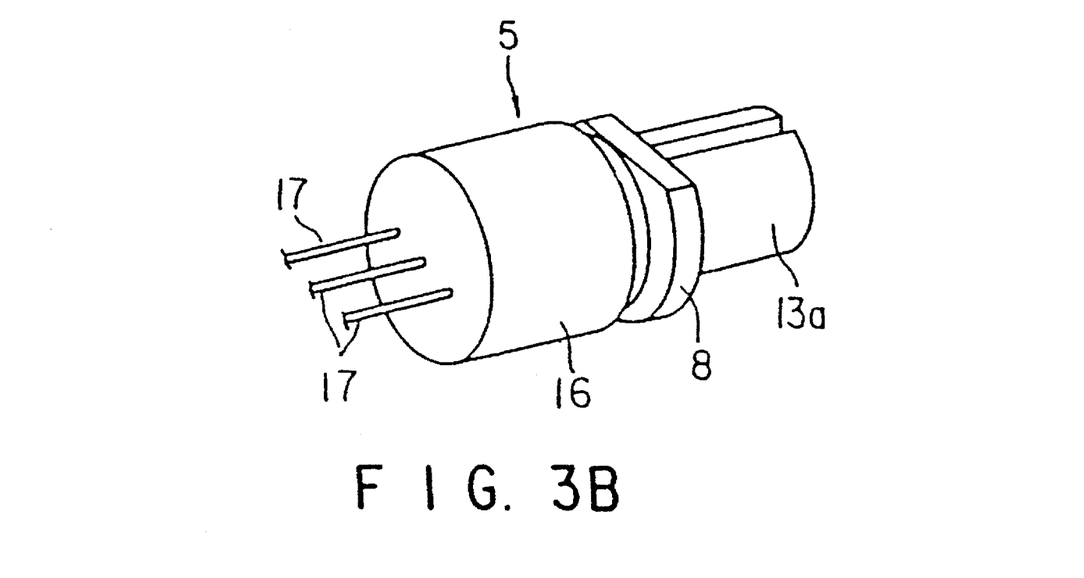
FIG. 3(B) is a perspective view showing another active device.

Alternatively, the rear housing 16 may be made integral with the front housing 15 as shown in FIG. 3(B).

Figure 4:
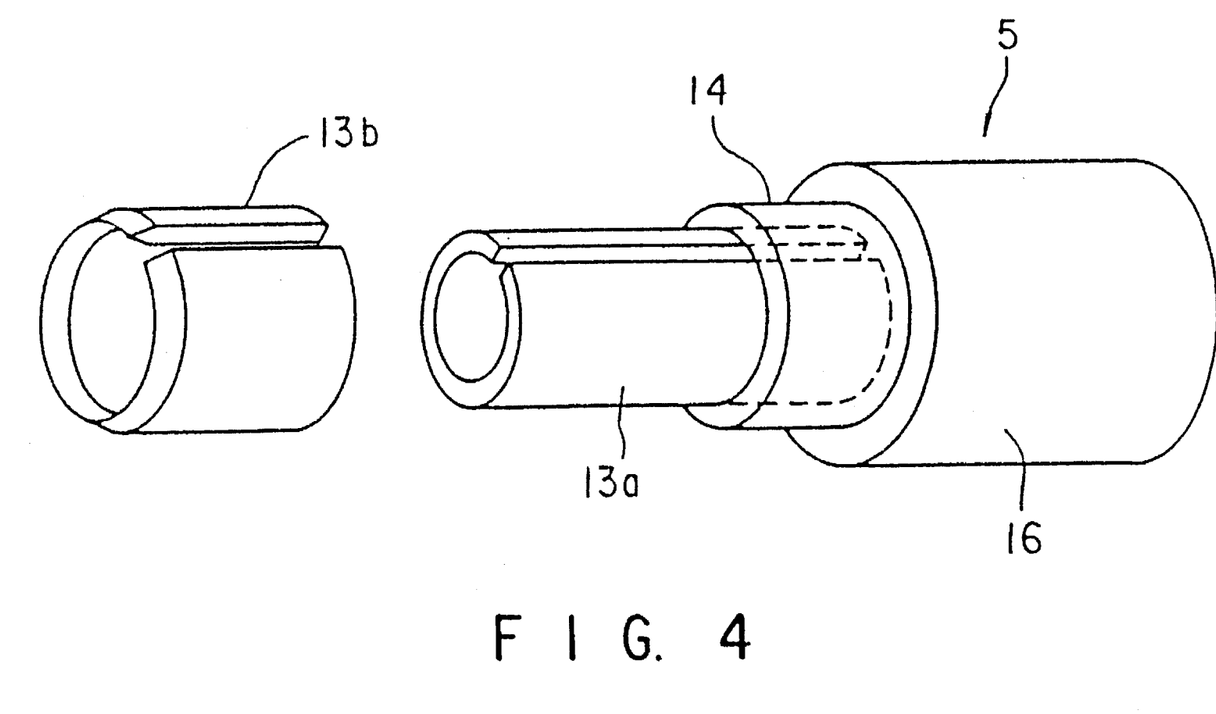
FIG. 4 is a perspective, enlarged view showing first and second sleeves of the optical connector shown in FIG. 1.

As shown in FIG. 4 in particular, the first sleeve 13a is of such a split type that it has a slit, along its length, extending from its free end (plug 1 side) to its fixed end (receptacle 2 side). The split sleeve 13a is made of plastics or other suitable materials having a proper elastic deformation characteristic. The fixed end of the split sleeve 13a is inserted into the cylindrical tube 14 and fixed there. In FIG. 4, the flange 8 is omitted for clarity of the split sleeve 13a.

The operation of the split sleeve 13a will be explained below with reference to FIGS. 5 to 9.

Figure 5:
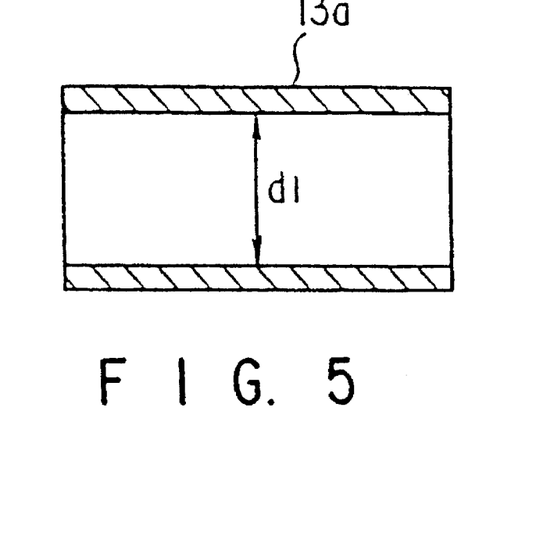
FIG. 5 is a cross-sectional view showing a first split sleeve in a normal state.
Figure 6:
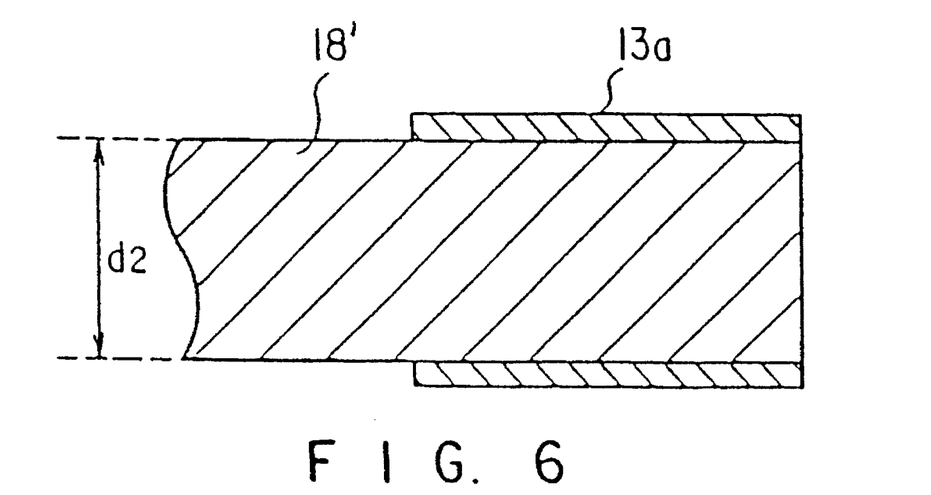
FIG. 6 is a cross-sectional view showing the first split sleeve into which a diameter adjusting plug is inserted.
Figure 7:
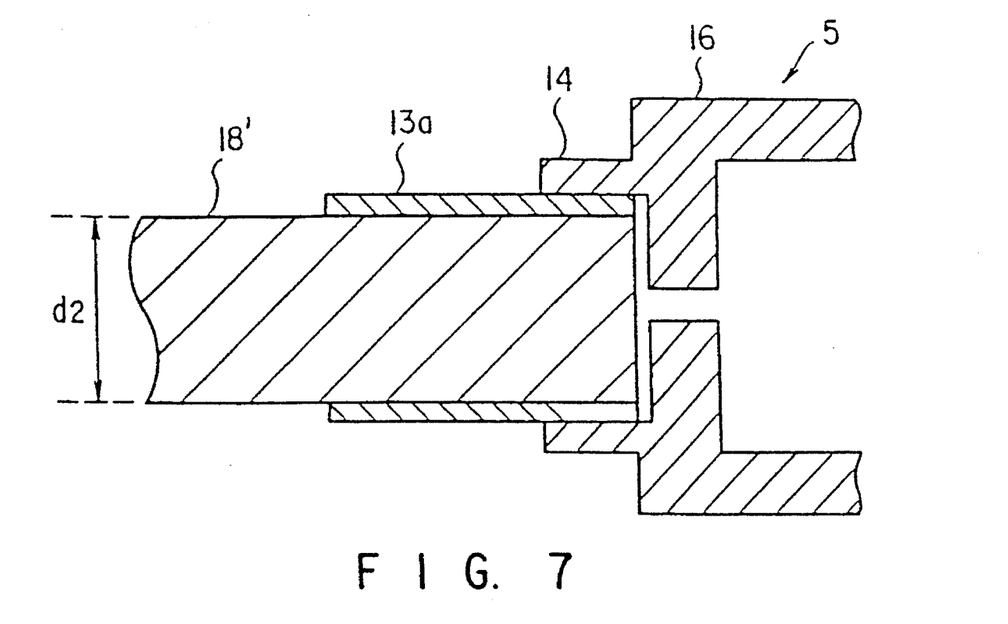
FIG. 7 is a cross-sectional view showing the first split sleeve fixed to the receptacle with the diameter adjusting plug inserted into the sleeve.

In a normal state, a split sleeve 13a has an inner diameter d1 made slightly smaller than the diameter of the ferrule 18 (FIG. 5). Upon the assembly of the optical connector, a diameter adjusting plug 18' whose outer diameter is equal to a maximum tolerance outer diameter d2 for the normal use of the ferrule 18 is inserted into the sleeve 13a to make the inner diameter of the sleeve 13a equal to the diameter d2 of the diameter adjusting plug 18' (FIG. 6). As a result, the fixing end of the sleeve 13a is fixed, or normally bonded, to the cylindrical tube 14 (FIG. 7) at which time the sleeve 13a is maintained to the inner diameter d2 of the plug 18'. During the insertion of the plug 18' in the split sleeve 13a, a force for returning that expand split sleeve 13a back to its original inner diameter normally acts upon the free end portion of the split sleeve 13a when the fixing end of the split sleeve 13a is fixed as set out above.

Figure 8:
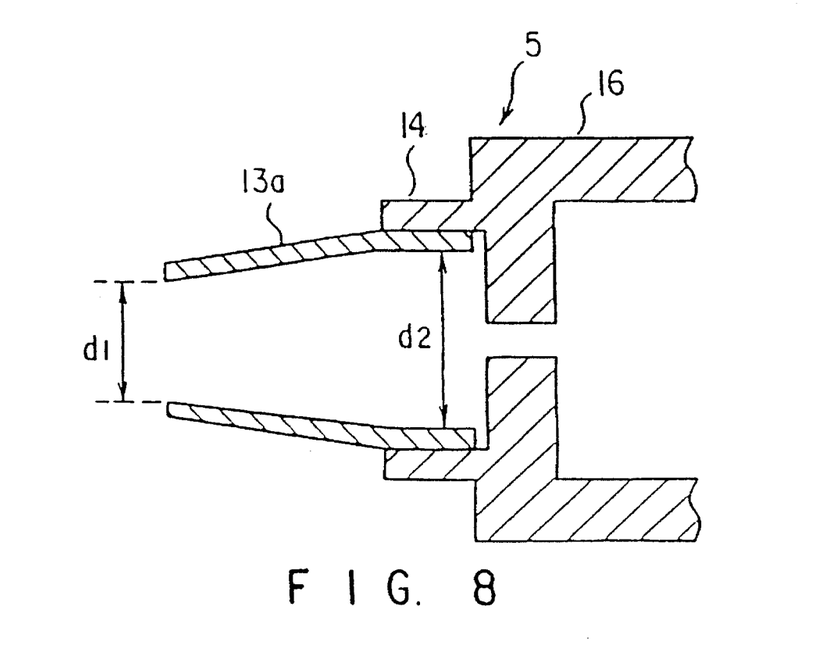
FIG. 8 is a cross-sectional view showing a receptacle and the first split sleeve fitted into the receptacle with the diameter adjusting plug removed.
Figure 9:
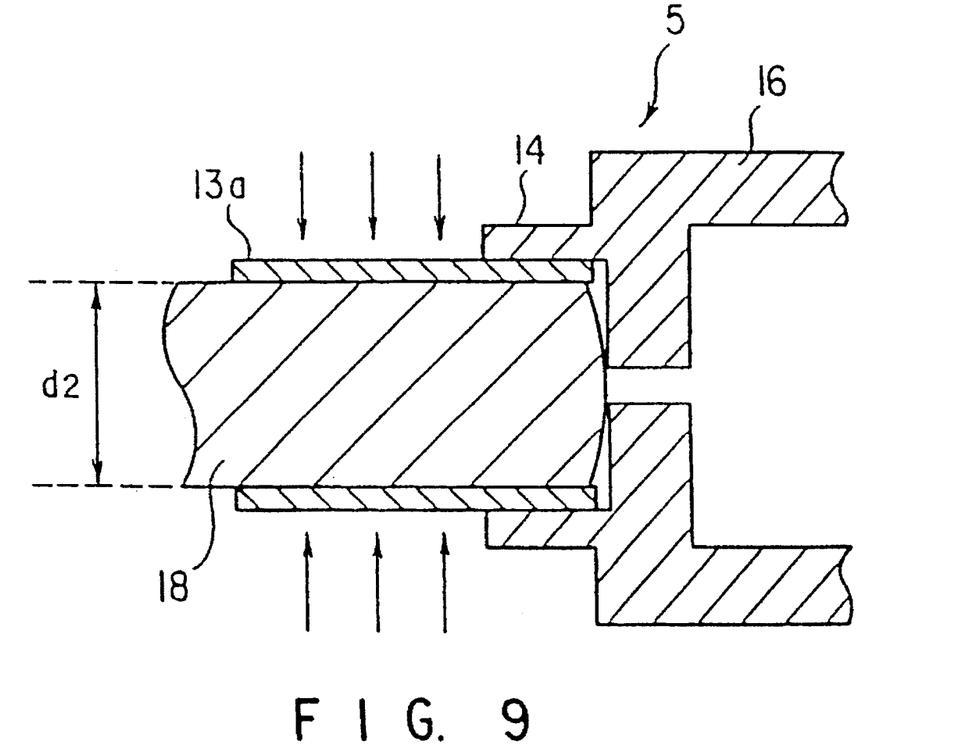
FIG. 9 is a cross-sectional view showing the receptacle and the first split sleeve fitted into the receptacle with a ferrule inserted into the first split sleeve.

After the bond of the sleeve 13a has hardened and the plug 18' has been removed, the deformation of the sleeve 13a causes the inner diameter of the sleeve 13a to be further decreased so that the split sleeve 13a can be returned back to its original inner diameter d1 in which case the inner diameter of the split sleeve 13a is made positively smaller than the inner diameter d2 value assumed when the ferrule 18 has been inserted into the split sleeve 13a (FIG. 8). That is, the inner diameter of the sleeve 13a may be varied along the length of the sleeve 13a due to the deformation of the sleeve 13a. As a result, any ferrule falling in a normal tolerance range is very intimately gripped due to the resultant deformation of the sleeve 13a (FIG. 9). When, therefore, the ferrule 18 is inserted into the free end portion of the first sleeve 13a, it is possible to achieve a stabler connection characteristic with a low connection loss. It is thus possible to achieve accurate alignment of the ferrule 18 relative to the optical input/output window and hence the opto-electronic element.

It is preferable that, as shown in FIG. 4, the active device 5 further have a second sleeve 13b into which the free end portion of the first sleeve 13a is inserted. The second sleeve 13b is comprised of a split sleeve having a slit, along its length, extending from one end (plug 1 side) to the other end (receptacle 2 side). The second sleeve 13b will typically be made of the same material as that of the first sleeve 13a.

To mount the second sleeve 13b on the free end of the sleeve 13a, the ferrule 18 which, is inserted into the second sleeve 13b from the side which will form its free end and is guided past the other end of the second sleeve 13b to the fixed end of the first sleeve 13a. The second sleeve 13b which is then pushed over the free end of the sleeve 13a further decreases the inner diameter of the free end portion of the first sleeve 13a, thereby increasing a gripping force on the ferrule 18 thus inserted into the first sleeve 13a.

Alternatively, the second sleeve 13b may be properly so designed as to be formed as an non-split type, etc., having internal ribs so that it can be properly fitted over the fixed end portion of the first sleeve 13a. Or the free end of the second sleeve 13b is designed as a re-entrant cone so as to readily guide the ferrule's forward end into the first sleeve 13a.

The flange 8 of the active device 5 includes a retaining section 8a fined into the groove 7 of the recess 7 and a rotation-stop flat (or detent) section 8b situated at an angle of substantially 90∞ relative to the retaining section 8a and hence the axis of the first sleeve 13a and provided as a partial cutout section. The flange 8 is fitted into the groove 7 when the active device 5 is incorporated into the housing 8.

Elastic latches 21a and 21b are provided in and relative to the side wall portions of the respective shells 3a and 3b at those areas inside the respective shells 3a and 3b and injection-molded integral with the corresponding shells. The respective elastic latches 21a and 21b are each formed as a cantilever beam having a free end portion extending toward the front end side, there is, toward the rectangular opening 4. The free ends of the elastic latches 21a and 21b have latch hooks 22a and 22b extending from their mutually confronting inner sides into the rectangular opening 4 as shown in FIG. 1.

A latch 24 is provided at the rear end of the shells 3a and 3b and has a groove in which a mount frame as will be set out below is fitted when the receptacle 2 is mounted on an associated apparatus. The latch 24 has separate latch sections 24a and 24b relative to the shells 3a and 3b. Upon assembling the shells 3a and 3b into one housing 3, the separate latch sections 24a and 24b provide one latch 24 as one unit.

A stepped section 25 is provided at the fight and left side surfaces of the plug 1 and, upon mounting the plug 1 into the receptacle 2, the stepped section of the plug is latched to the corresponding hook (22a, 22b) of the latches (21a, 21b). By inserting the plug 1 into the rectangular opening 4 of the receptacle 2, the ferrule 18 held in the plug is inserted into the first sleeve.13 fixed to the receptacle 2 and the hooks 22a and 22b of the elastic latches 21a and 21b are latched to the corresponding stepped sections (25, 25) of the plug 1. The first sleeve 13a enables the end face of optical fibre unit to be aligned with the aforementioned conversion element of the active device 5 so that both are optically coupled together.

It is preferable that a dust-proof shutter 27 be mounted in a window (26, 26) at each side walls of the housing 3. The shutter 27 is sheet-like in configuration as shown, for example, in FIG. 1. The shutter 27 has a plurality of elastic pieces 29 each with a hook 28 provided thereon and, in this case, the hooks 28 of the elastic pieces are snap-fitted on the marginal edge of the window 26. Upon mounting the shutter 27 in the window 26, the elastic pieces 29 of the shutter 27 is inserted into the window 26 until the shutter 27 is brought into contact with the side surface of the housing 3 and, by so doing, the engaging hooks of the shutter are automatically snap-fitted around the marginal side of the window 26, thus holding the shutters 27 in place around the marginal edge of the window.

In the case where, in order to apply the present invention to a double connector, a double receptacle is so designed as to connect two receptacles 2 together, a corresponding shutter 27 can serve as a connecting member. Stated in more detail, a plurality of elastic pieces 29 each with an engaging hook 28 provided thereon are projected from each surface of the shutter 27 and, in this case, the elastic pieces of the respective surface sides of the shutter are inserted into the corresponding windows 26 of the side walls of the adjacent receptacles 2. By so doing, the shutter 27 covers both the windows 26 of the adjacent receptacles and also connects together the adjacent receptacles 2. In this connection it is to be noted that a double plug is of such a type as to connect together two plugs 1 by a well known method.

In place of the shutter 27 use may be made of an automatic shutter which is provided at the opening 4 of the housing 3 to enable the opening 4 to be automatically closed when the receptacle 2 is withdrawn from the plug 1. When, in this case, the plug 1 is not inserted into the receptacle 2, the optical input/output end of a opto-electronic element in the active device 5 can be shielded from an entry of any external dust.

The assembly of the receptacle 2 is made as follows:

i) The first and second sleeves 13a and 13b are mounted in the active device 5.

ii) The flange 8 of the active device 5 is so positioned that it is fitted in the recess 6a (or 6b) of one of the shells 3a, 3b and then these shells 3a and 3b are matingly connected together.

iii) The mating end faces of these shells are joined together by, for example, an ultrasonic welding, a laser welding and a bonding method.

As a result, the active device 5 is fixed to the housing 3 in a manner to be held between the recesses 6a and 6b of the shells 3a and 3b. In this case, the active device 5 is restrained against any axial movement or rotation.

Figure 10A:
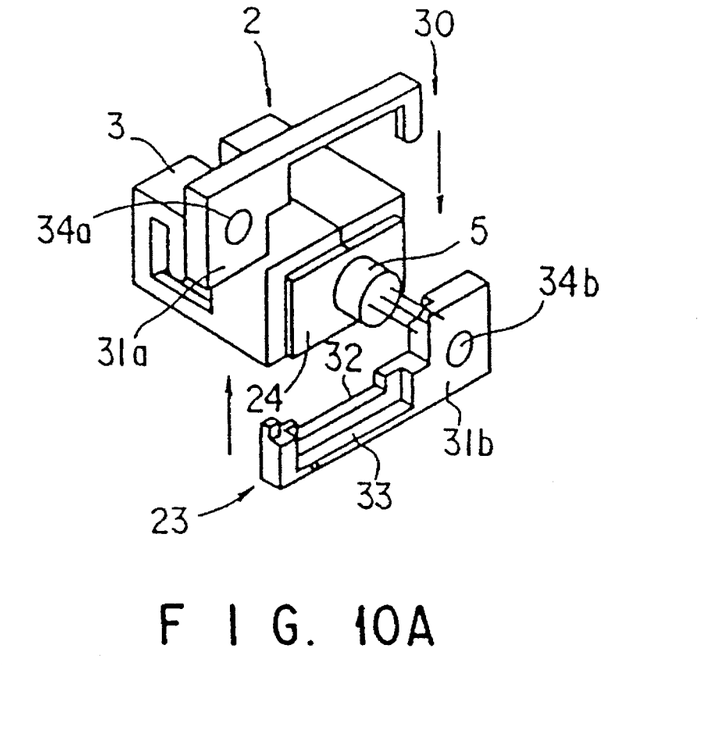
FIG. 10(A) is a perspective, enlarged view showing a frame for fixing the receptacle in place and, FIG. 10(B) is a perspective view showing the frame of FIG. 10(A) in an assembled state.
Figure 10B:
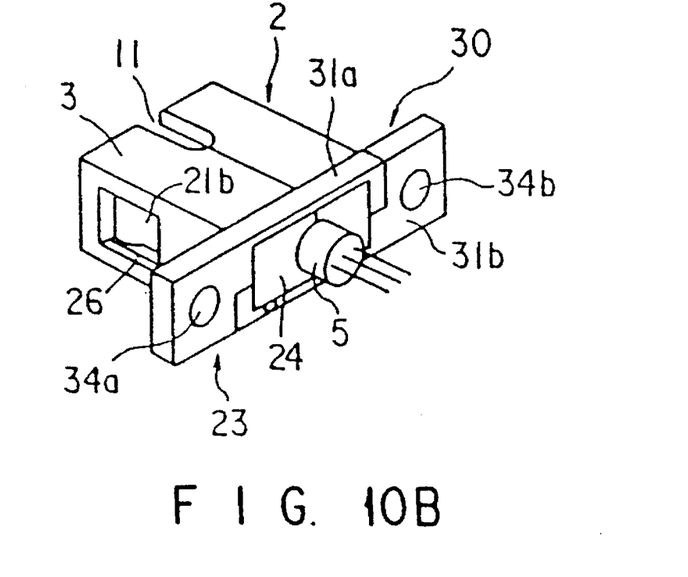

As shown in FIGS. 10(A) and 10(B), a mount frame 30 for mounting the receptacle 2 on the associated apparatus is comprised of upper and lower frame members 31a and 31b. The respective frame members, each, have a ridge 32 and groove 33 to allow them to be click-fitted around the latch 24. As shown in FIG. 10(A), the upper and lower frame members 31a and 31b are fitted together in an up/down direction in a manner to hold the latch 24 of the receptacle 2 therebetween and an integral frame 30 is provided as shown in FIG. 10(B). It is thus possible to readily click-fit the frame 30 over the receptacle 2 without the need to use any welding or bonding method. The respective frame members are fastened to the associated apparatus by inserting screws, not shown, into those associated screw holes 34a, 34b.

Figure 11:
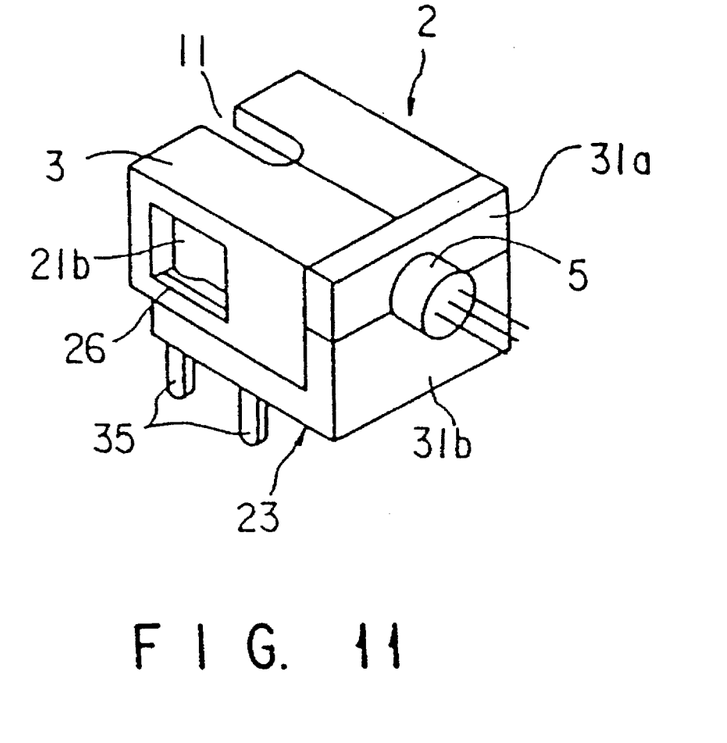
FIG. 11 is a perspective view showing still another frame.

In FIG. 11, another frame 30 can be assembled as one unit by fitting a pair of frame members 31a, 31b around the latch of the receptacle 2 as in the case of the previous frame 30. In this case, however, metal legs are provided on one of the frame members 31a, 31b so as to fix the frame 30 to a circuit board, not shown. That is, the frame 30 is mounted to the circuit board by inserting the legs 35 on the frame member 31b into the associated through holes in the circuit board and deforming, for example bending, these legs. The frame members 31b in FIG. 11 is of such a configuration as to contact with the lower surface of the housing 3 of the receptacle 2.

Figure 12:
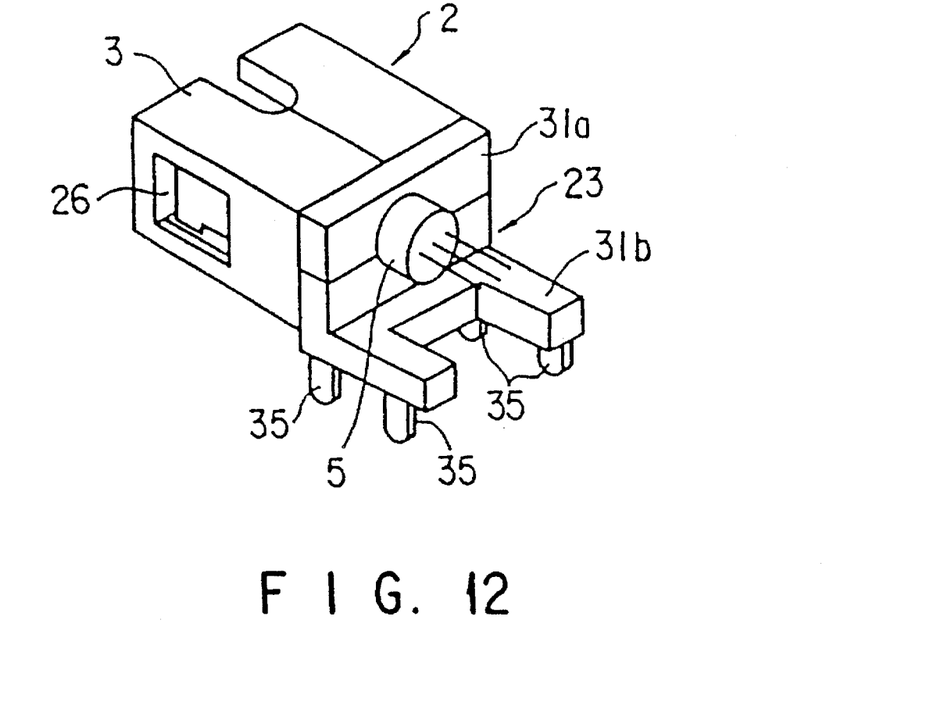
FIG. 12 is a perspective view showing still yet another frame.

A still another frame 30 in FIG. 12 is similar to the frame 30 in FIG. 11 except that a frame member 31b is of such a configuration as to be projected rearwardly from the receptacle 2.

Figure 13:
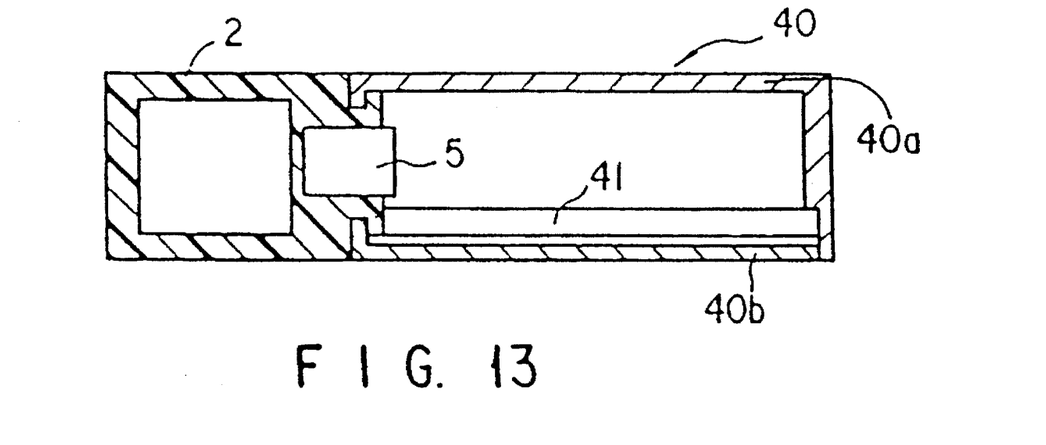
FIG. 13 is a cross-sectional view showing a receptacle on which a housing is mounted with a light/electricity conversion circuit incorporated therein.

After the manufacture of the optical connector, a housing 40 can be mounted on the optical connector for a opto-electronic conversion circuit to be associated with the opto-electronic conversion element of the active device 5 as shown in FIG. 13. The housing 40 includes a circuit board 41 having the aforementioned conversion circuit.

The housing 40 is comprised of upper and lower housing members 40a and 40b. The upper and lower housing members provide an integral housing 40 by mounting them around the latch 24 of the receptacle 2 in the same way as when the frame 30 is mounted on the receptacle 2.

It is possible, from the manufacturing point of view, to apply the present invention to all optical connectors using ferrules of a common diameter. It is thus possible to automatically manufacture, test and examine the respective optical connector, in the same process, for a light emitting diode (LED), a semiconductor laser diode (LD), a PIN photodiode (PIN-PD) and other basic optical devices.

It is particularly useful to have an optical connector of the SC style shell construction. In the case where those optical connectors of an SC shell structure are beforehand manufactured in great number and kept in stock for a customer demand, it is possible to ship them to customers after they are subjected to a similar step or steps so that, for example, a circuit system and housing can be added to the optical connector in accordance with the type of opto-electronic conversion-elements. In this way, it is possible to respond quickly to a customer's demand.

Although, in the aforementioned embodiment, the optical connector has been explained as a one suitable to the optical fibre unit and opto-electronic conversion element, the present invention is not restricted thereto. For example, the present invention can also be applied to those optical connectors for connecting together two optical fibre unit and, in this case, these two optical fibre units are aligned by the first sleeve with each other and the same advantages as those of the previous embodiments can also be obtained upon the manufacture of the optical connector. Further, the present invention can be applied not only to the SC type connector type but also all those receptacle type optical connectors associated with a fibre supporting ferrule, such as FC type and ST type connectors.

It should be noted that according to the optical connector of the present invention as set out above, the fist optical medium is gripped by the elastic deformation of the split tube member and can accommodate some change in its dimension and a manufacturing allowance. Further, since the split tube member is fixed at one end, it is possible to suppress a loss in the elastic deformation characteristic of the split tube member resulting from a passage of time in use. Therefore, a better gripping force can be provided so as to achieve the alignment of the first optical medium for a prolonged period of time. Thus a standardised optical connector can be obtained with high connection reliability.

I claim:

1. An optical connector comprising a socket member which includes a split sleeve having an inner surface arranged to grip a plug member associated with an optical medium and an outer surface, characterised in that an end of the split sleeve is secured by its outer surface to the socket member in its expanded state, the other, free end being free to contract to its original size.

2. An optical connector according to claim 1, wherein the optical medium is an optical transmission line.

3. An optical connector according to claim 1, wherein the socket member is associated with an opto-electronic conversion element.

4. An optical connector as claimed in claim 1, which includes a compression member secured about said free end of the split sleeve.

5. An optical connector for optically connecting together first and second optical media having corresponding optical input/output ends, comprising: plug means for supporting the first optical medium; receptacle means connectable to the plug means and supporting the second optical medium; and a split sleeve member having a free end via which the optical input/output end of the first optical medium can be inserted and an end fixed to the receptacle means and located at the optical input/output end of the second optical medium and a slit extending from its free end to its fixed end and gripping the first optical medium through an elastic deformation toward its substantial center axis, wherein, when the plug means is connected to the receptacle means, the optical input/output end of the first optical medium is optically aligned with that of the second optical medium solely through the elastic deformation of the split sleeve member.

6. The optical connector according to claim 5, further comprising urging means for urging the gripping of the first optical medium through the elastic deformation of the split sleeve member.

7. An optical connector according to claim 6, wherein the urging means is comprised of guide means for guiding the insertion of the first optical medium into the split sleeve member.

8. An optical connector according to claim 5, wherein the first optical medium is an opto-electronic conversion element.

9. An optical connector according to claim 5, wherein the first optical medium is an optical transmission line.

10. An optical connector according to claim 5, wherein the second optical medium is an optical transmission line.

11. An optical connector according to claim 5, wherein the receptacle means includes a short cylindrical tube member and the split sleeve member at the end fixed to the receptacle means is bonded in an expanded state to the inner surface of the short cylindrical tube member, whereby the split sleeve member has a larger inner diameter at the fixed end than at the free end.

12. An optical connector according to claim 11, wherein the split sleeve inner diameter at the fixed end is equal to a maximum outer tolerance diameter for the first optical medium.

* * * * *